(12) United States Patent
Nguyen

(10) Patent No.: US 11,105,450 B1
(45) Date of Patent: Aug. 31, 2021

(54) SWIVEL FLANGE FLOWLINE FITTING

(71) Applicant: Cantex International, Inc., Houston, TX (US)

(72) Inventor: Duy D. Nguyen, Cypress, TX (US)

(73) Assignee: Cantex International, Inc., Houston, TX (US)

( * ) Notice: Subject to any disclaimer, the term of this patent is extended or adjusted under 35 U.S.C. 154(b) by 56 days.

(21) Appl. No.: 16/787,901

(22) Filed: Feb. 11, 2020

Related U.S. Application Data

(60) Provisional application No. 62/946,453, filed on Dec. 11, 2019.

(51) Int. Cl.
*F16L 27/08* (2006.01)

(52) U.S. Cl.
CPC ................................ *F16L 27/0845* (2013.01)

(58) Field of Classification Search
CPC .................................................. F16L 27/0845
See application file for complete search history.

(56) References Cited

U.S. PATENT DOCUMENTS

| | | | |
|---|---|---|---|
| 866,482 A * | 9/1907 | Kilpatrick | |
| 3,329,449 A | 7/1967 | Herold et al. | |
| 3,418,009 A | 12/1968 | Pollia | |
| 3,784,233 A * | 1/1974 | Hilbert | H02G 3/065 |
| | | | 285/12 |
| 4,099,542 A | 7/1978 | Gibbons | |
| 4,354,698 A | 10/1982 | Linder et al. | |
| 4,557,509 A * | 12/1985 | Giebeler | F16L 37/53 |
| | | | 285/112 |
| 5,887,908 A | 3/1999 | White | |
| 6,331,020 B1 | 12/2001 | Brunella | |
| 8,783,733 B2 | 7/2014 | Tausch | |
| 9,068,450 B2 * | 6/2015 | Guidry | E21B 33/03 |
| 9,470,349 B2 | 10/2016 | Am et al. | |
| 9,982,492 B2 | 5/2018 | Hanton et al. | |
| 10,323,475 B2 | 6/2019 | Christopherson et al. | |
| 10,774,965 B1 | 9/2020 | Hill et al. | |
| 10,995,561 B1 * | 5/2021 | Travix | E21B 17/05 |

(Continued)

OTHER PUBLICATIONS

Cameron, *Frac Manifold Systems* (© 2016).
Sypris Technologies, Inc., *Flanges*(Feb. 2014).
Werner Solken, *What is a Swivel Ring Flange?* (© 2008-2019).

*Primary Examiner* — James M Hewitt, II
(74) *Attorney, Agent, or Firm* — Keith B. Willhelm

(57) ABSTRACT

A swivel flange fitting for a high-pressure flow line has a fitting body, a hub, and a rotatable flange. The fitting body has a central conduit with internal threads proximate to a terminus of the central conduit. The hub is threaded into the fitting body. The hub has a central conduit, a portion having a nominal outer diameter, and an end. The portion has external threads engaging the fitting body internal threads. The end has an enlarged outer diameter relative to the nominal outer diameter, a flange-type union face, and an inward-facing shoulder. The rotatable flange has a central passage having an outward-facing shoulder and a plurality of openings adapted to accommodate threaded connectors for applying axial load to the flange. The flange outward-facing shoulder is adapted to bear on the hub inward-facing shoulder to transmit axial load applied to the flange from the flange to the hub.

26 Claims, 5 Drawing Sheets

(56) References Cited

U.S. PATENT DOCUMENTS

| | | | |
|---|---|---|---|
| 2002/0050260 A1* | 5/2002 | Harvey | F16L 41/004 |
| | | | 123/184.21 |
| 2004/0212191 A1* | 10/2004 | Segal | F16L 33/223 |
| | | | 285/334.5 |
| 2006/0131873 A1 | 6/2006 | Klingbail et al. | |
| 2007/0056155 A1* | 3/2007 | Reimert | F16L 23/024 |
| | | | 29/456 |
| 2007/0114039 A1* | 5/2007 | Hobdy | E21B 33/03 |
| | | | 166/379 |
| 2011/0304138 A1 | 12/2011 | Commoner | |
| 2012/0193910 A1 | 8/2012 | Vice et al. | |
| 2018/0187507 A1 | 7/2018 | Hill et al. | |
| 2018/0187662 A1 | 7/2018 | Hill et al. | |
| 2019/0203862 A1 | 7/2019 | Ungchusri et al. | |

* cited by examiner

SWIVEL FLANGE FLOWLINE FITTING

FIELD OF THE INVENTION

The present invention relates generally to fluid transportation systems, flow lines in such systems, and fittings for flowlines, and especially to fittings for flowlines such as fracturing systems that will convey abrasive, corrosive fluids under high pressure.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then can flow from the porous formation into the well.

Hydrocarbons, however, are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and stimulating production from formations. In particular, various techniques are available for increasing production from formations which are relatively nonporous.

Perhaps the most important stimulation technique is the combination of horizontal wellbores and hydraulic fracturing. A well will be drilled vertically until it approaches a formation. It then will be diverted, and drilled in a more or less horizontal direction, so that the borehole extends along the formation instead of passing through it. More of the formation is exposed to the borehole, and the average distance hydrocarbons must flow to reach the well is decreased. Fractures then are created in the formation which will allow hydrocarbons to flow more easily from the formation.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is forced into the formation at rates faster than can be accepted by the existing pores, fractures, faults, vugs, caverns, or other spaces within the formation. Pressure builds rapidly to the point where the formation fails and begins to fracture. Continued pumping of fluid into the formation will tend to cause the initial fractures to widen and extend further away from the wellbore, creating flow paths to the well. The proppant serves to prevent fractures from closing when pumping is stopped.

Systems for successfully completing a fracturing operation are extensive and complex, as may be appreciated from FIG. 1. FIG. 1 illustrates schematically a conventional frac system. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry. The slurry is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11.

Pumps 10 take the slurry and discharge it at high pressure through individual high-pressure "discharge" lines 12 into a "missile" 13 on frac manifold 9. The combined flow from pump discharge lines 12 flows through missile 13 into a high-pressure line 14 running to a junction head 15 of a "zipper" manifold 16 (also referred to by some as a "frac manifold"). Zipper manifold 16 includes flow lines 17 running to, for example, two well heads 19 that control flow into and out of the well. Valves 18 are provided in zipper flow lines 17 so that the frac slurry may be selectively diverted to one of the well heads 19. Once fracturing is complete, flow back from the fracturing operation discharges into a flowback manifold 20 which leads into flowback tanks 21. Valves 18 then will be operated to divert frac fluid into the other well head 19 to frac that well.

The pressures and flow rates required to fracture typical oil and gas wells are extremely high: pressures up to 20,000 psi and flow rates up to 100 bbl/minute. Such pressures and rates greatly exceed the capacity of any single frac pump. The cumulative output of many frac pumps, therefore, is required to reach the required pressures and flow rates. High pressure conduits must be assembled to convey fluid from the array of pumps ultimately into a single well. The components of such frac systems are known generally in the art as flow iron, frac iron, or ground iron.

Frac system flow lines typically will be assembled from a large number of frac iron components. The flow lines also may include valves and other flow control or monitoring components. Since they are intended for temporary use, the flowline components typically will be assembled with various types of unions. Unions allow the components to be connected ("made up") and disconnected ("broken down") relatively quickly.

The three types of unions commonly used in frac systems are hammer (or "Weco®") unions, clamp (or "Greyloc®") unions, and flange unions. Though spoken of in terms that may imply they are discreet components, unions are actually interconnected subassemblies of the components joined by the union. A male sub will be on one component, and a mating female sub will be on the other. The subs then will be connected to each other to provide the union.

Flange unions are made up by threaded connectors extending through cooperating flanges provided on the mating components. The flange extends around the conduit opening and has an array of holes extending around its periphery. The holes accommodate the threaded connectors. A union face also is provided on the flange. The union face is generally flat, but has a very slight annular boss extending upwards around the conduit opening. Typically, the union face also will be provided with a metal ring seal that is mounted in annular grooves provided in the annular boss. The threaded connectors allow the flanges on mating components to be drawn together such that they bear on each other along their union faces.

Flange unions may be made and broken down with relative ease. Their basic design is robust and reliable. Like other flowline components, components having flange union subs are fabricated from heavy, high tensile steel. Thus, they have been adapted for low pressure (1,000 to 2,000 psi), medium pressure (2,000 to 6,000 psi), and high-pressure service (6,000 to 20,000 psi). Components rated for high-pressure service are particularly suitable for use in systems for fracturing oil and gas wells.

The well is fixed, however, and the trailer or skid on which the frac manifold is mounted can only be moved with difficulty. Thus, flow lines invariably must incorporate fittings that allow flexibility in assembling flow lines along a desired course. "Swivel flange" (aka "swivel ring" or "swivel ring flange") fittings are one type of component that can be used to provide such flexibility in the course of a flow line.

One common design for swivel flange fittings comprises a fitting body, such as a straight piece of pipe or an elbow, to which is welded a two-piece swivel flange assembly. The swivel flange assembly includes a hub that will be welded to the fitting body and a flange that rotates around the hub. The rotating flange allows the component to be joined to another component by a flange union and at the same time provides flexibility in aligning a the connector holes and the fitting body.

Frac jobs, however, have become more extensive, both in terms of the pressures required to fracture a formation and the time required to complete all stages of an operation. Prior to horizontal drilling, a typical vertical well might require fracturing in only one, two or three zones at pressures usually well below 10,000 psi. The longest horizontal extensions of a well bore now are almost three and a half miles long. Fracturing a horizontal well, therefore, may require fracturing in 20 or more zones. Horizontal wells in shale formations such as the Eagle Ford shale in South Texas typically require fracturing pressures of at least 9,000 psi and 6 to 8 hours or more of pumping. Horizontal wells in the Haynesville shale in northeast Texas and northwest Louisiana require pressures around 13,500 psi. Pumping may continue near continuously—at flow rates of 2 to 3 thousand gallons per minute (gpm)—for several days before fracturing is complete. All that places increasing performance demands on swivel flange fittings and other flowline components used to fracture a well.

The statements in this section are intended to provide background information related to the invention disclosed herein. Such information may or may not constitute prior art. It will be appreciated from the foregoing, however, that there remains a need for new and improved swivel flange fittings. Such disadvantages and others inherent in the prior art are addressed by various aspects and embodiments of the subject invention.

SUMMARY OF THE INVENTION

The subject invention, in its various aspects and embodiments, relates generally flowline fittings having a rotating flange that allows the fitting to be assembled into a flow line, and especially to such fittings that may be used in flow lines for frac systems and other systems that convey abrasive, corrosive fluids under high pressure.

One broad embodiment provides a swivel flange fitting. The fitting comprises a fitting body, a hub, and a rotatable flange. The fitting body has a central conduit with internal threads proximate to a terminus of the central conduit. The hub is threaded into the fitting body. The hub has a central conduit, a portion having a nominal outer diameter, and an end. The hub nominal outer diameter portion has external threads engaging the fitting body internal threads. The hub end has an enlarged outer diameter relative to the nominal outer diameter, a flange-type union face, and an inward-facing shoulder. The a rotatable flange has a central passage and a plurality of openings adapted to accommodate threaded connectors for applying axial load to the flange. The flange central passage has an outward-facing shoulder which is adapted to bear on the hub inward-facing shoulder to transmit axial load applied to the flange from the flange to the hub.

Other embodiments provide such swivel flange fittings where the rotatable flange is mounted on the hub between the hub end and the fitting body.

Still other embodiments provide such swivel flange fittings where the fitting body central conduit has a nominal inner diameter and a first portion of enlarged diameter, and the internal threads are provided in the enlarged diameter portion.

Yet other embodiments provide such swivel flange fittings where the hub central conduit has an inner diameter substantially equal to the nominal inner diameter of the fitting body central conduit.

Additional embodiments provide such swivel flange fittings where the rotatable flange is mounted on the hub between the hub end and the fitting body, the fitting body central conduit has a nominal inner diameter and a first portion of enlarged diameter, and the internal threads are provided in the enlarged diameter portion, and the hub central conduit has an inner diameter substantially equal to the nominal inner diameter of the fitting body central conduit.

Other embodiments provide such swivel flange fittings where the fitting body conduit has a second portion of enlarged inner diameter and the hub has a portion of reduced outer diameter relative to the hub nominal outer diameter.

Still other embodiments provide such swivel flange fittings where the fitting comprises a pressure seal mounted between the second enlarged diameter portion of the fitting body conduit and the reduced outer diameter portion of the hub.

Yet other embodiments provide such swivel flange fittings where the pressure seal is mounted in a gland provided on the reduced outer diameter portion of the hub.

Additional embodiments provide such swivel flange fittings where the hub inward-facing shoulder and the flange outward-facing shoulder have mating beveled surfaces.

Other embodiments provide such swivel flange fittings where the hub extends beyond the end of the fitting body a distance sufficient to accommodate installation of nuts on the threaded connectors.

Still other embodiments provide such swivel flange fittings where the flange openings are through-holes.

Yet other embodiments provide such swivel flange fittings where the fitting comprises a second the hub threaded into the fitting body by engaging the hub external threads with internal threads in the fitting body conduit proximate to a second terminus of the fitting body conduit.

Additional embodiments provide such swivel flange fittings where the fitting is rated for service pressures of from about 1,000 to 2,000 psi, or from about 2,000 to 6,000 psi, or at least about 6,000 psi.

Other aspects and embodiments of the subject invention provide novel flow lines. The novel flow lines incorporate the novel swivel flange fittings. Still other aspects and embodiments of the subject invention provide novel systems for fracturing a well and other high-pressure fluid transportation systems. The systems comprise the novel swivel flange fittings and flow lines.

Finally, still other aspects and embodiments of the invention provide such swivel flange fittings having various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the manner in which it may be practiced. The subject invention encompasses other embodiments consistent with the disclosure provided herein.

Figure 1:
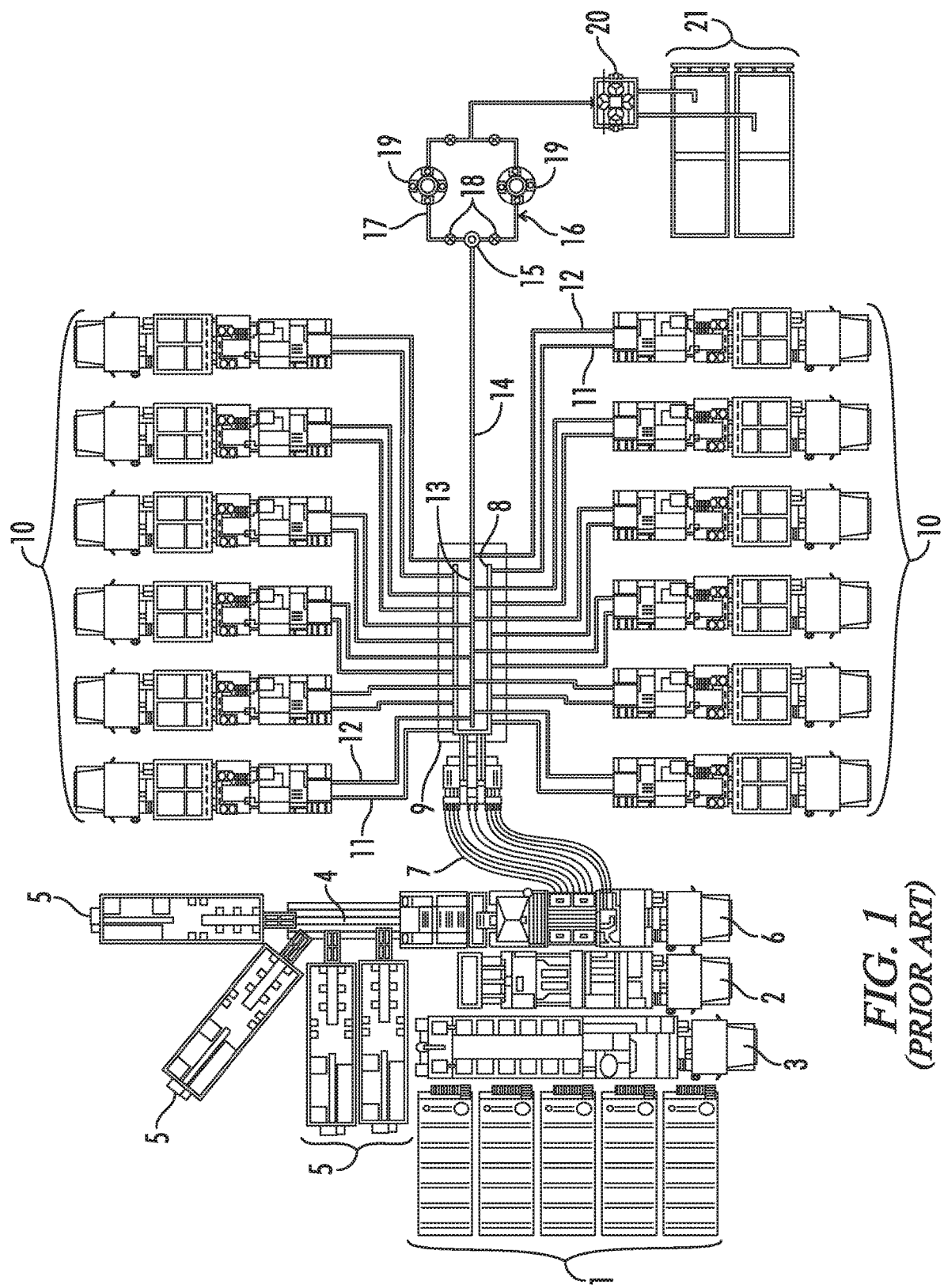
FIG. 1 (prior art) is a schematic view of a system for fracturing a well and receiving flowback from the well.
Figure 2:
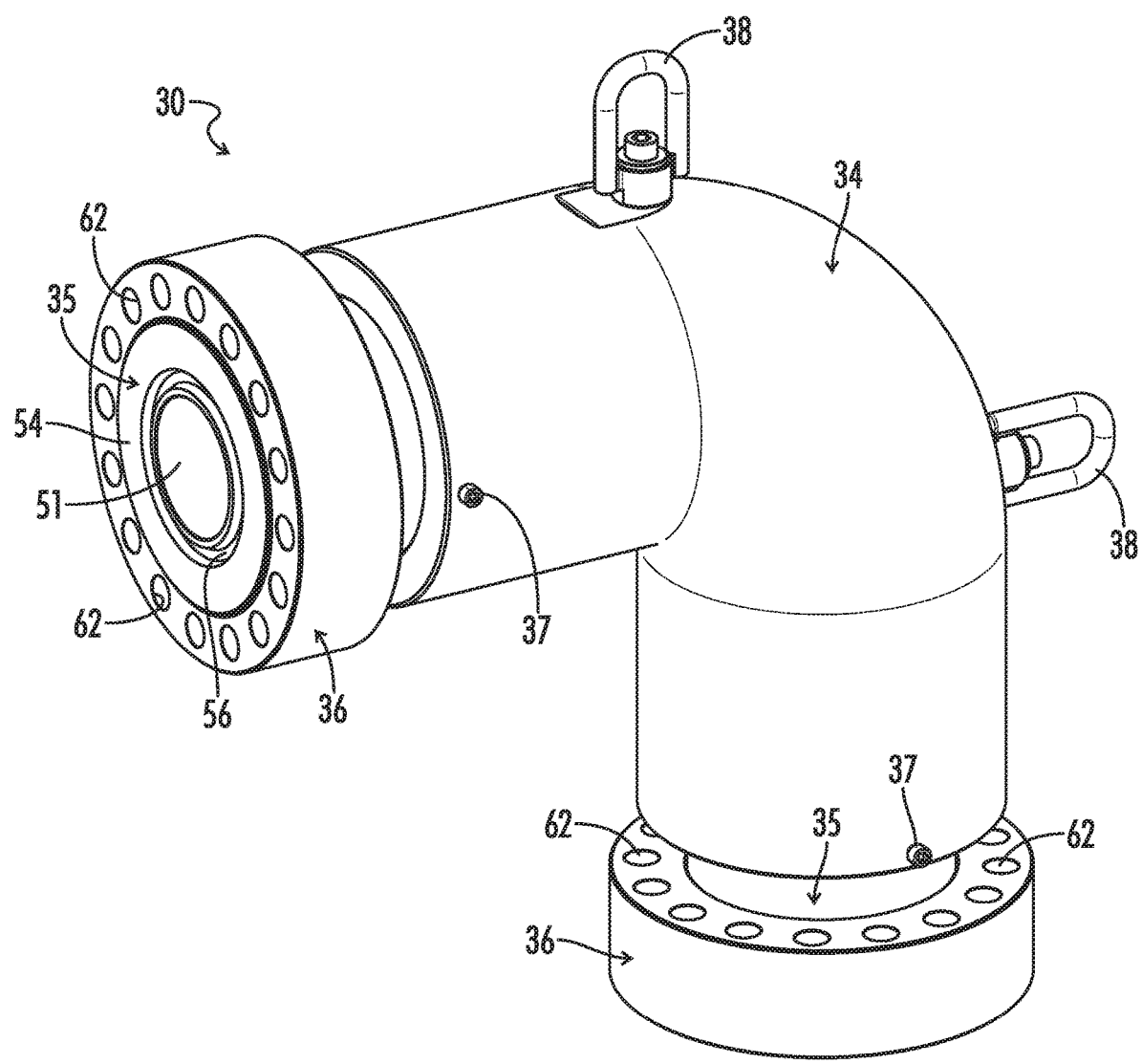
FIG. 2 is an isometric view of a first preferred embodiment 30 of the swivel flange flowline fittings of the subject invention, which fitting 30 is a 90 elbow fitting.

In the drawings and description that follows, like parts are identified by the same reference numerals. The drawing figures also are not necessarily to scale. Certain features of the embodiments may be shown exaggerated in scale or in somewhat schematic form and some details of conventional design and construction may not be shown in the interest of clarity and conciseness. For example, certain features and components of the embodiments shown in the figures have been omitted to better illustrate the remaining components.

DESCRIPTION OF ILLUSTRATIVE EMBODIMENTS

The invention, in various aspects and embodiments, is directed generally to flowline fittings having a rotating flange that allows the fitting to be assembled into a flow line, and especially to such fittings that may be used in flow lines for frac systems and other systems that convey abrasive, corrosive fluids under high pressure. Various specific embodiments will be described below. For the sake of conciseness, however, all features of an actual implementation may not be described or illustrated. In developing any actual implementation, as in any engineering or design project, numerous implementation-specific decisions must be made to achieve a developer's specific goals. Decisions usually will be made consistent within system-related and business-related constraints. Specific goals may vary from one implementation to another. Development efforts might be complex and time consuming and may involve many aspects of design, fabrication, and manufacture. Nevertheless, it should be appreciated that such development projects would be routine effort for those of ordinary skill having the benefit of this disclosure.

A first preferred embodiment 30 of the novel flowline fittings is shown in FIGS. 2-5. As may be seen therein, fitting 30 is an elbow fitting providing a bend of a approximately 90°. It may be assembled into a flowline, such as flowline 14 of the frac system shown in FIG. 1. As depicted schematically therein, flowline 14 runs straight from missile 13 of frac manifold 9 to junction head 15 of zipper manifold 16. Elbow fitting 30, however, may be used to provide a change of direction in, that is, the heading of flow line 14 to accommodate the position of frac manifold 9 and zipper manifold 16 relative to each other.

When elbow fitting 30 is assembled into a frac system it preferably will be rated for high pressures, that is, rated pressures of at least about 6,000 psi. Elbow fitting 30 and other embodiments of the novel fittings, however, may be rated for low pressure service (from about 1,000 to about 2,000 psi) or for medium pressure service (from about 2,000 to about 6,000 psi) and used in lower pressure systems.

Elbow fitting 30 generally comprises a fitting body 34 and, at each end thereof, a hub 35 and a rotating ring or flange 36. Elbow fitting 30, as described further below, can be assembled by slipping flange 36 over and around the inner end of hub 35. The inner end of hub 35 then will be threaded into fitting body 34. Set screws 37 may be provided to minimize the likelihood that hub 35 will loosen during service. Once assembled, flange 36 is able to rotate freely about hub 35 until it is assembled into a flow line.

Fitting body 34 is a section of pipe having a central conduit 41 which has been bent to an angle of approximately 90°. Conduit 41 at each end of fitting body 34 is provided with internal threads. The exact position of the internal threads can vary, but generally they will be proximate to the termini of conduit 41 as exemplified. Conduit 41 can have a uniform diameter, but preferably it is profiled to closely accommodate hubs 35. For example, as seen best in FIGS. 4-5, the internal threads may be provided in a first area of enlarged diameter (relative to the nominal diameter id) of conduit 41. The first area of enlarged diameter in conduit 41 tapers radially and axially inward (relative to the central axis of fitting body conduit 41) to a second area of enlarged diameter. The second area of enlarged diameter has a diameter less than that of the first area of enlarged diameter, but still is greater than the nominal diameter id of conduit 41. The second area of enlarged diameter preferably, as shown, provides a smooth, sealing surface.

Hubs 35 are threaded into the enlarged diameter portions at each end of conduit 41 of fitting body 34. Hub 35 is a profiled, generally cylindrical component having a central a conduit 51. The diameter of hub conduit 51 preferably matches or closely approximates the nominal diameter id of fitting body conduit 41. Thus, when hubs 35 are mounted in fitting body 34, fitting body conduit 41 and hub conduits 51 will form a smooth, continuous conduit through elbow fitting 30. A mismatch in diameters generally will not be preferred. The mismatch will be a source of turbulence in fluid flow through the fitting. Fitting body conduit 41 and hub conduits 51, however, may have different diameters. For example, different diameters may be desired to choke flow through elbow fitting 30.

The outer diameter of hub 35 is profiled and threaded at the inner end thereof to allow hub 35 to be threaded into the termini of fitting body conduit 41. For example, as seen best in FIGS. 4-5, inner end of hub 35 has an outer diameter that is profiled and threaded to fit within the enlarged diameter portions of conduit 41 at the ends of fitting body 34. More specifically, the mid-portion of hub 35 has a nominal outer diameter od. The mid-portion of hub 35 is provided with external threads on its inner end. The threaded portion of hub 35 leads into a taper extending axially and radially inward to an area of reduced outer diameter.

Figure 3:
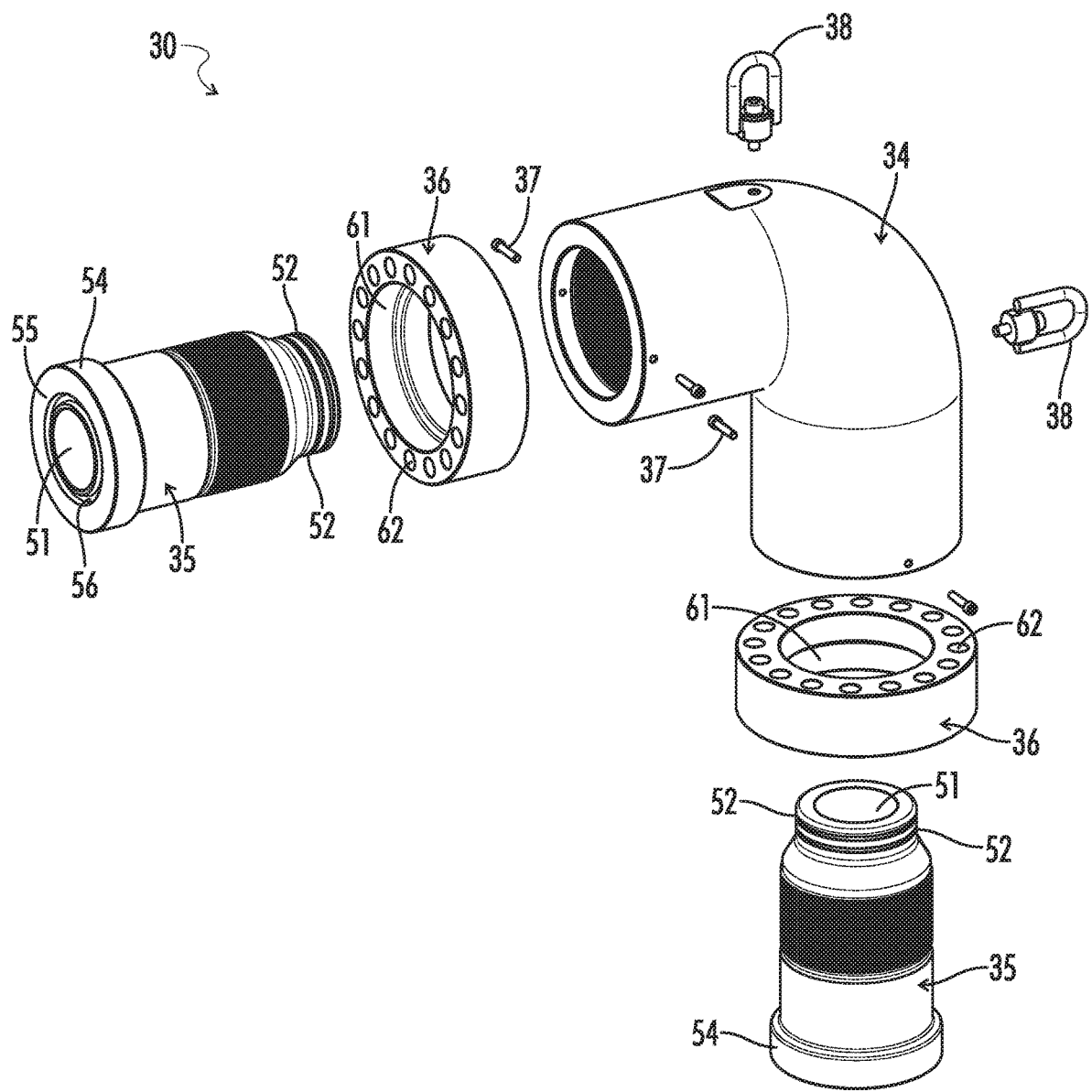
FIG. 3 is an exploded, isometric view of elbow fitting 30 shown in FIG. 2 showing the components thereof.
Figure 4:
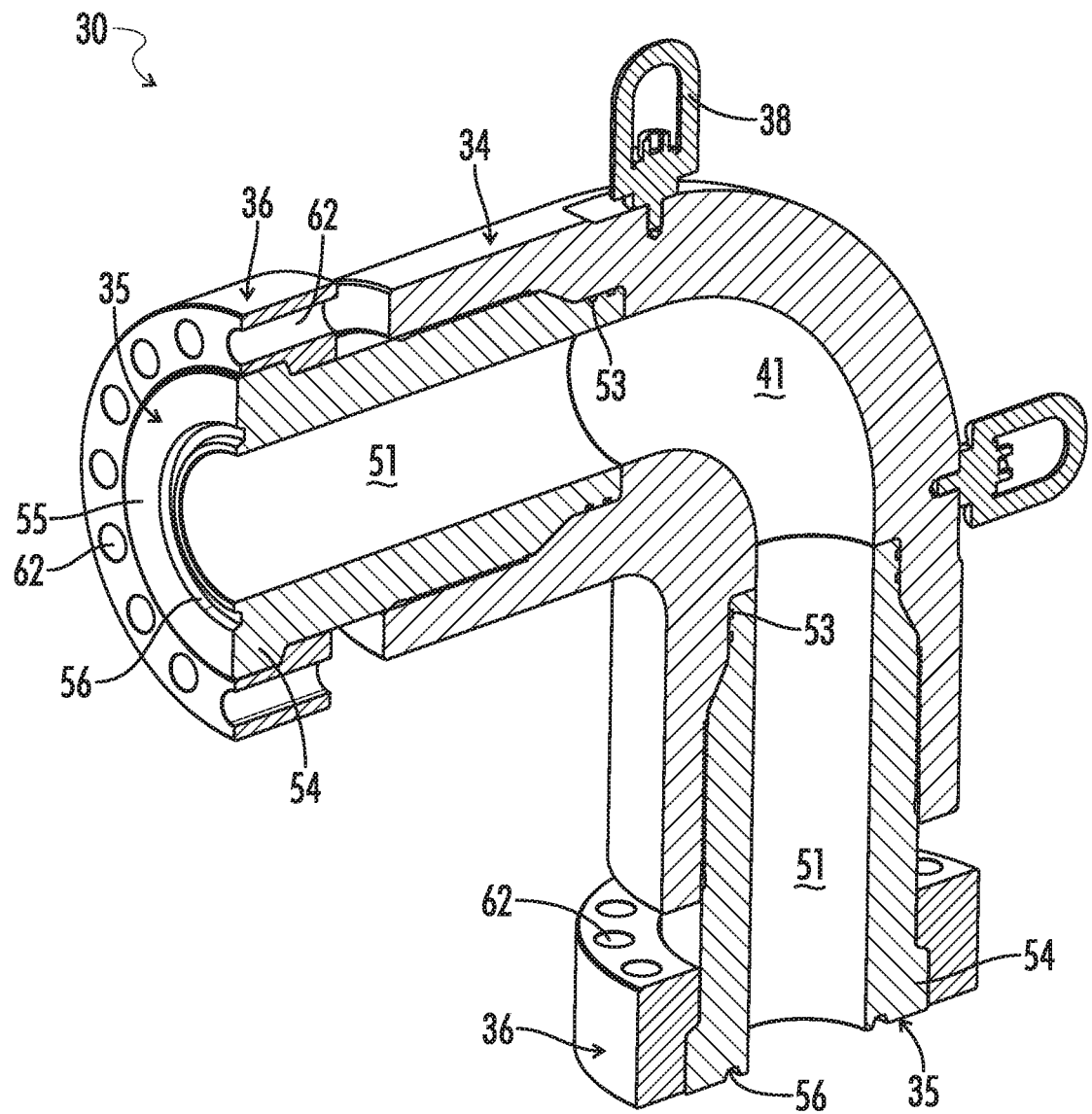
FIG. 4 is an isometric, cross-sectional view of elbow fitting 30 shown in FIGS. 2-3.
Figure 5:
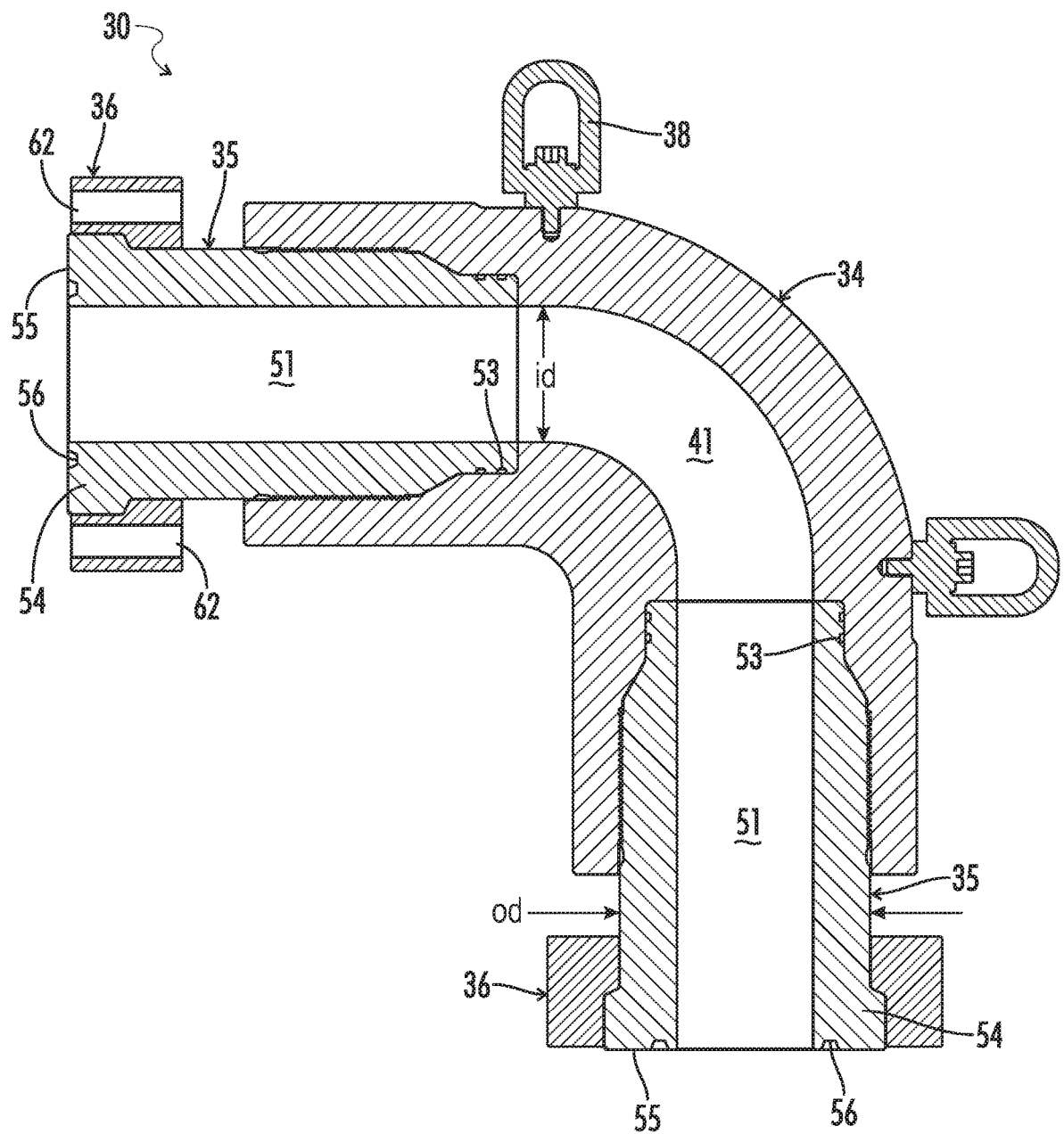
FIG. 5 is a cross-sectional view of elbow fitting 30.

The reduced outer diameter area of hub 35 preferably, as shown, is smooth and provided with one or more pressure seals 52 (shown only in FIG. 3). Pressure seals 52 are radial seals that are mounted between the reduced outer diameter area of hub 35 and the second enlarged diameter area of conduit 41 of fitting body 34. Pressure seals 52 are adapted to isolate hydraulic pressure within elbow fitting 30 and to prevent flow of fluids between hub 35 and fitting body 34. They may be mounted in any conventional manner, but preferably are mounted in an outer annular groove or "gland" 53 extending around the reduced outer diameter area of hub 35. Alternately, they may be mounted in an inner gland in the second enlarged diameter area of fitting body conduit 41.

Two pressure seals 52 preferably are provided between hub 35 and fitting body 34. Outer, secondary seal 52 is mounted on the low-pressure side of inner, primary seal 52 and provides redundancy in the event inner seal 52 fails. Additional seals may be provided, however, or a single seal may be used if desired. If desired, glands for additional seals may be provided between the inner face of hub 35 and the shoulder formed in fitting body conduit 41.

Although other types of seals may be suitable, pressure seals 52 preferably are static seals. They will be sized and configured such that when hub 35 is installed within fitting body conduit 41 they are under relatively high compression. Various conventional designs may be used, but more typically static pressure seals 52 will be elastomeric O-rings, square cut rings, or lobed rings. The tolerance between the outer surface of hub 35 and the inner surface of fitting body conduit 41 may be minimized and will be quite close. Thus, though they may be provided if desired, backup rings and the like typically will not be required for static pressure seals 52.

Typically, pressure seals 52 will be fabricated from elastomers such as nitrile butadiene rubber (NBR), hydrogenated nitrile butadiene nitrile rubber (HNBR), fluoroelastomers such as Viton® and Dyneon™, and tetrafluoroethylene propylene rubbers, such as Aflas™, polyurethane, and fluorosilicone. The choice of materials will be driven by conventional considerations, most commonly the nature of the fluids, the temperatures, and the pressures to which the seals will be exposed. For example, fluoroelastomers may be preferred for oily and corrosive fluids, and harder nitrile and polyester rubbers may be preferred for higher pressure seals.

Flanges 36 are mounted on hubs 35 so that they may rotate freely as elbow fitting 30 is assembled into a flow line. More specifically, a portion of hub 35 extends beyond the end of fitting body 34. Flange 36 is a toroid-shaped component having a central opening 61. The inner profile of flange opening 61 and the outer diameter of hub 35 are profiled to allow flange 36 to slip over the inner end of hub 35 and rotate freely about the outer portion of hub 35.

Hubs 35 and flanges 36 also are adapted to allow elbow fitting 30 to be made up and broken down from other flowline components by a flange-type union. That is, hub 35 has an enlarged-diameter outer end 54. The face of hub outer end 54 is provided with a flange union face 55. Flange union face 55 provides a flat, annular sealing surface that will mate with, and be loaded against the sealing surface of a flange union face on the component to which it will be joined. An annular groove 56, as is typical, is provided in the sealing surface. An annular metal seal (not shown) is carried in groove 56 to provide a seal between the union faces.

The sealing surface and annular groove 56, as it typical, are provided on a very slight annular boss extending from flange union face 55. The annular boss will help ensure a that the abutment between mating union faces is properly loaded when the flange union is made up. The designs and features of flange-type union faces and flange unions in general are well known, however, and union faces 55 on hubs 35 may be varied in accordance with common practice in the art.

The rotating flange of the novel fittings are provided with an array of holes that are adapted to accommodate threaded connectors that will be used to apply axial load to the flange. For example, flange 36 has an array of cylindrical passageways or through-holes 62 that extend through flange 36 and are arranged radially around its opening 61. Threaded connectors, such as threaded studs or bolts (not shown), may be passed through holes 62 to load flange 36 and union face 55 as a flange union is made up between elbow fitting 30 and another flowline component. In that regard, it will be noted that hub 35 extends a distance beyond the end of fitting body 34 sufficient to allow the installation of nuts on the threaded connector.

An enlarged diameter area of opening 61 of flange 36 provides an outward-facing shoulder. The flange outward-facing shoulder abuts with an inward-facing shoulder provided on outer end 54 of hub 35. Thus, flange 36 may slide freely, but is restricted in its axial movement by outer end 54 of hub 35 and the end of fitting body 34. Moreover, as the threaded connectors generate axial load between mating flanges, the axial load will be transferred through the mating shoulders to hub 35 to load the mating union faces 55 of elbow fitting 30 and the component to which it is joined.

Like flange union faces 55, rotating flange 36 may be adapted in various conventional ways. For example, instead of through-holes 62, rotating flange 36 may be provided with bottomed holes in which threaded studs are mounted. For such designs, if desired, hub 35 may be shortened. There will be no need to create clearance to accommodate installation of nuts on the threaded connectors.

It will be appreciated that because flange 36 freely rotates or "swivels" about hub 35 before the flange union is fully made up, it will be easier to align holes 62 in flange 36 with the corresponding holes or studs on the component to which it will be joined. Moreover, before the threaded connectors are loaded to seal the mating union faces, fitting body 34 of elbow fitting 30 may be rotated relative to the joined component to whatever degree is necessary to make up the flow line. Once the union is fully loaded, flange 36 will no longer be able to rotate relative to fitting body 34.

Fitting 30 is an elbow fitting providing a 90° turn. It is provided with swivel flanges 36 at both its ends. Other types of fitting, however, may be provided with one or more swivel flanges as exemplified in the context of elbow fitting 30. Such fittings may include, for example, straight pipe and tee, wye, lateral, and cross fittings. They may be provided with a swivel flange at one or more of their union ends. The novel swivel flange fittings also may be provided with various features common in other types of fittings. Elbow fitting 30, for example, is provided with lifting eyes 38 to assist in assembling and disassembling elbow fitting 30 into a flow line.

It will be appreciated that not only may the novel swivel flange components be assembled more easily, but that they also allow the fitting to be rebuilt more easily. That is, swivel flanges in general are quite durable and can withstand rough handling. The union faces, however, can be damaged relatively easily and, once damaged, allow leaks to develop. Since the hub in conventional swivel flange components is welded on or otherwise integral with the component body, the entire component may have to be scrapped if a union face is damaged. The novel components, however, allow the hub to be replaced. Moreover, the hub in the novel components may be made from a wider range of materials, including harder steels that are more resistant to damage, but which may be more difficult to weld or bend.

The swivel flange fittings of the subject invention may be manufactured by methods and from materials commonly used in manufacturing flow iron components. Given the extreme stress, the cyclic vibrations, the corrosive and abrasive fluids, and the high-pressure, high-velocity flow to which frac systems and the like are exposed, suitable materials will be hard and strong. For example, the components of the novel fittings, except for their seals, may be manufactured from 4130 and 4140 chromoly steel or from somewhat harder, stronger steel such as 4130M7, high end nickel alloys, and stainless steel. As noted, different materials may be used in the hub. The components may be made may be made by any number of conventional techniques, but typically and in large part will be made by forging, extruding, or mold casting a blank part and then machining the required features into the part.

While this invention has been disclosed and discussed primarily in terms of specific embodiments thereof, it is not intended to be limited thereto. Other modifications and embodiments will be apparent to the worker in the art.

What is claimed is:

1. A swivel flange fitting for a flow line, said fitting comprising:
   (a) a fitting body, said fitting body having a central conduit with internal threads proximate to a terminus of said central conduit;
   (b) a hub threaded into said fitting body, said hub having:
      i) a central conduit,
      ii) a portion having a nominal outer diameter, said nominal outer diameter portion having external threads engaging said fitting body internal threads, and
      iii) an end having an enlarged outer diameter relative to said nominal outer diameter, said hub end:
         (1) having a flange-type union face, and
         (2) an inward-facing shoulder, and
   (c) a rotatable flange, said rotatable flange:
      i) having a central passage having an outward-facing shoulder;
      ii) a plurality of openings adapted to accommodate threaded connectors for applying axial load to said flange; and
      iii) wherein said flange outward-facing shoulder is adapted to bear on said hub inward-facing shoulder to transmit axial load applied to said flange from said flange to said hub.

2. The swivel flange fitting of claim 1, wherein said rotatable flange is mounted on said hub between said hub end and said fitting body.

3. The swivel flange fitting of claim 1, wherein said fitting body central conduit has a nominal inner diameter and a first portion of enlarged diameter, and said internal threads are provided in said enlarged diameter portion.

4. The swivel flange fitting of claim 1, wherein said hub central conduit has an inner diameter substantially equal to a nominal inner diameter of said fitting body central conduit.

5. The swivel flange fitting of claim 1, wherein:
   (a) said rotatable flange is mounted on said hub between said hub end and said fitting body;
   (b) said fitting body central conduit has a nominal inner diameter and a first portion of enlarged diameter, and said internal threads are provided in said enlarged diameter portion; and
   (c) said hub central conduit has an inner diameter substantially equal to said nominal inner diameter of said fitting body central conduit.

6. The swivel flange fitting of claim 1, wherein said fitting body conduit has a second portion of enlarged inner diameter and said hub has a portion of reduced outer diameter relative to said hub nominal outer diameter.

7. The swivel flange fitting of claim 6, wherein said fitting comprises a pressure seal mounted between said second enlarged diameter portion of said fitting body conduit and said reduced outer diameter portion of said hub.

8. The swivel flange fitting of claim 7, wherein said pressure seal is mounted in a gland provided on said reduced outer diameter portion of said hub.

9. The swivel flange fitting of claim 5, wherein said fitting body conduit has a second portion of enlarged inner diameter and said hub has a portion of reduced outer diameter relative to said hub nominal outer diameter.

10. The swivel flange fitting of claim 9, wherein said fitting comprises a pressure seal mounted between said second enlarged diameter portion of said fitting body conduit and said reduced outer diameter portion of said hub.

11. The swivel flange fitting of claim 1, wherein said hub inward-facing shoulder and said flange outward-facing shoulder have mating beveled surfaces.

12. The swivel flange fitting of claim 1, wherein said hub extends beyond the end of said fitting body a distance sufficient to accommodate installation of nuts on said threaded connectors.

13. The swivel flange fitting of claim 1, wherein said flange openings are through-holes.

14. The swivel flange fitting of claim 1, wherein said fitting comprises a second said hub threaded into said fitting body by engaging said hub external threads with internal threads in said fitting body conduit proximate to a second terminus of said fitting body conduit.

15. The swivel flange fitting of claim 1, wherein said fitting is rated for service pressures of at least about 6,000 psi.

16. A high-pressure flow line, said high-pressure flow line being rated for service pressures of at least about 6,000 psi and comprising the swivel flange fitting of claim 1.

17. The high-pressure flow line of claim 16, wherein said high-pressure flowline is incorporated into a system for fracturing a well.

18. A high-pressure fluid transportation system, said system comprising the high-pressure flow line of claim 16.

19. A high-pressure fluid transportation system for fracturing a well, said system a comprising the high-pressure flow line of claim 16.

20. The swivel flange fitting of claim 5, wherein said fitting is rated for service pressures of at least about 6,000 psi.

21. The swivel flange fitting of claim 7, wherein said fitting is rated for service pressures of at least about 6,000 psi.

22. The swivel flange fitting of claim 10, wherein said fitting is rated for service pressures of at least about 6,000 psi.

23. The swivel flange fitting of claim 1, wherein said fitting is rated for service pressures of from about 2,000 to about 6,000 psi.

24. The swivel flange fitting of claim 5, wherein said fitting is rated for service pressures of from about 2,000 to about 6,000 psi.

25. The swivel flange fitting of claim 7, wherein said fitting is rated for service pressures of from about 2,000 to about 6,000 psi.

26. The swivel flange fitting of claim 10, wherein said fitting is rated for service pressures of from about 2,000 to about 6,000 psi.

\* \* \* \* \*